(12) United States Patent
Takenaka et al.

(10) Patent No.: US 10,391,925 B2
(45) Date of Patent: Aug. 27, 2019

(54) VEHICLE HEADLIGHT WITH A PLURALITY OF INNER NON SPHERICAL LENSES TRANSMITTING LIGHT FROM A HIGH BEAM AND A LOW BEAM LIGHT SOURCE

(71) Applicant: HONDA MOTOR CO., LTD., Tokyo (JP)

(72) Inventors: Nobuyuki Takenaka, Wako (JP); Hidemasa Aoki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/895,096

(22) Filed: Feb. 13, 2018

(65) Prior Publication Data

US 2018/0264993 A1    Sep. 20, 2018

(30) Foreign Application Priority Data

Mar. 15, 2017    (JP) .................... 2017-049404

(51) Int. Cl.
*B60Q 1/04*    (2006.01)
*B62J 6/02*    (2006.01)
(Continued)

(52) U.S. Cl.
CPC ............. *B60Q 1/0408* (2013.01); *B60Q 1/34* (2013.01); *B62J 6/001* (2013.01); *B62J 6/005* (2013.01);
(Continued)

(58) Field of Classification Search
CPC .... F21W 2107/17; F21S 41/26; F21S 41/295; F21S 41/143; F21S 43/14; F21S 41/141; F21Y 2115/10
See application file for complete search history.

(56) References Cited

U.S. PATENT DOCUMENTS

| 7,114,837 | B2 * | 10/2006 | Yagi | F21S 41/147 362/523 |
| 9,033,563 | B1 | 5/2015 | Hsu | |
| 9,302,724 | B2 * | 4/2016 | Hayashi | B62J 6/02 |
| 9,683,724 | B2 * | 6/2017 | Takenaka | F21S 45/48 |

(Continued)

FOREIGN PATENT DOCUMENTS

| DE | 102015009096 | 1/2017 |
| EP | 3015348 | 5/2016 |

(Continued)

OTHER PUBLICATIONS

European Search Report dated Aug. 29, 2018, 8 pages.
Japanese Office Action with English translation dated Oct. 2, 2018, 9 pages.

*Primary Examiner* — Robert J May
(74) *Attorney, Agent, or Firm* — Rankin, Hill & Clark LLP (57) ABSTRACT

A headlight includes a housing, a low-beam light source and a high-beam light source, a board, and an upper inner lens and a lower inner lens. The low-beam light source and the high-beam light source are each formed of an LED that is housed in the housing and radiates light. The board controls light beams emitted from the low-beam light source and the high-beam light source. The upper inner lens and the lower inner lens are provided in the housing and allow each of the light beams emitted from the low-beam light source and the high-beam light source to be transmitted through the upper inner lens and the lower inner lens toward the vehicle front side. At least part of the board is disposed to overlap with the rear side of the upper inner lens for the low-beam light source.

20 Claims, 10 Drawing Sheets

(51) Int. Cl.
  *B62J 6/00* (2006.01)
  *B60Q 1/34* (2006.01)
  *F21S 41/143* (2018.01)
  *F21S 41/20* (2018.01)
  *F21S 41/29* (2018.01)
  *F21S 41/55* (2018.01)
  *F21S 45/47* (2018.01)
  *F21W 107/17* (2018.01)

(52) U.S. Cl.
  CPC ............... *B62J 6/02* (2013.01); *F21S 41/143* (2018.01); *F21S 41/285* (2018.01); *F21S 41/29* (2018.01); *F21S 41/295* (2018.01); *F21S 41/55* (2018.01); *F21S 45/47* (2018.01); *F21W 2107/17* (2018.01)

(56) References Cited

U.S. PATENT DOCUMENTS

| | | | |
|---|---|---|---|
| 9,944,340 B2 * | 4/2018 | Kheawhorm | ........ B60Q 1/0035 |
| 10,077,878 B2 * | 9/2018 | Tsuchiya | .................... B62J 6/02 |
| 2014/0313762 A1 | 10/2014 | Owada | |

FOREIGN PATENT DOCUMENTS

| | | | |
|---|---|---|---|
| JP | 2013-129281 A | 7/2013 |
| JP | 2014-184786 A | 10/2014 |
| JP | 2015-26469 A | 2/2015 |
| JP | 2015-133170 A | 7/2015 |
| JP | 5888792 | 3/2016 |
| JP | 2016-181341 A | 10/2016 |
| WO | 2011/030375 A1 | 2/2013 |

\* cited by examiner

VEHICLE HEADLIGHT WITH A PLURALITY OF INNER NON SPHERICAL LENSES TRANSMITTING LIGHT FROM A HIGH BEAM AND A LOW BEAM LIGHT SOURCE

INCORPORATION BY REFERENCE

The present application claims priority under 35 U.S.C. § 119 to Japanese Patent Application No. 2017-049404 filed on Mar. 15, 2017. The content of the application is incorporated herein by reference in its entirety.

TECHNICAL FIELD

The present invention relates to a headlight structure of a saddled vehicle.

BACKGROUND ART

Conventionally, a configuration is known in which a headlight that employs a light emitting diode (LED) as a light source is mounted on a saddled vehicle and, in the headlight, a board is disposed on the rear side of a lens and a light guide member and an auxiliary light source is provided at the front end part of the board (for example, refer to Patent Document 1).

PRIOR ART DOCUMENT

Patent Document

[Patent Document 1]
Japanese Patent No. 5888792

SUMMARY OF THE INVENTION

Problem to be Solved by the Invention

In Patent Document 1, when the headlight is viewed from the front side, the front end part of the board is visible through the lens and the light guide member, which impairs the appearance. Furthermore, the board is disposed to extend in the front-rear direction and therefore the size of the headlight is large in the front-rear direction.

An object of the present invention is to provide a headlight structure of a saddled vehicle with which it is possible to intend improvement in the appearance and size reduction of the headlight.

Means for Solving the Problem

An aspect of the present invention provides a headlight structure of a saddled vehicle on which a headlight (65) is mounted. The headlight (65) includes a housing (91), a low-beam light source (92) and a high-beam light source (93) each formed of an LED that is housed in the housing (91) and radiates light, a control board (101) that controls light beams emitted from the low-beam light source (92) and the high-beam light source (93), and non-spherical inner lenses (103, 104) that are provided in the housing (91) and allow each of the light beams emitted from the low-beam light source (92) and the high-beam light source (93) to be transmitted through the non-spherical inner lenses (103, 104). At least part of the control board (101) is disposed to overlap with the rear side of the non-spherical inner lens (103) for the low-beam light source (92).

In the above-described aspect of the invention, the low-beam light source (92) may be disposed on the upper side of the high-beam light source (93) and the control board (101) may control light emitted from both the low-beam light source (92) and the high-beam light source (93).

Furthermore, in the above-described aspect of the invention, the control board (101) may be disposed on the upper side relative to the low-beam light source (92).

Moreover, in the above-described aspect of the invention, the low-beam light source (92) and the high-beam light source (93) may be attached to the housing (91) made of a metal.

In addition, in the above-described aspect of the invention, wiring (112, 113) connected to the low-beam light source (92) and the high-beam light source (93) may be covered from the front side by an extension member (106) that covers a circuit of the low-beam light source (92) and the high-beam light source (93).

Furthermore, in the above-described aspect of the invention, the non-spherical inner lenses (103, 104) for the low-beam light source (92) and the high-beam light source (93) and the extension member (106) may be co-fastened to the housing (91) by a plurality of screws (108) disposed outside the low-beam light source (92) and the high-beam light source (93) in the vehicle width direction, and the wiring (112, 113) may pass between the plurality of screws (108) disposed on one side in the vehicle width direction and be connected to the control board (101).

Moreover, in the above-described aspect of the invention, the low-beam light source (92) and a pair of left and right blinkers (66) provided at a vehicle body front part may lie in a line in the vehicle width direction in front view.

In addition, in the above-described aspect of the invention, the non-spherical inner lens (103) for the low-beam light source (92) or the non-spherical inner lens (104) for the high-beam light source (93) may be attached to the housing (91) by a plurality of other screws (109) disposed outside the low-beam light source (92) or the high-beam light source (93) in the vehicle width direction, and the plurality of screws (108) and the plurality of other screws (109) may be different in the interval in the vehicle width direction.

Effects of the Invention

At least part of the control board of the aspect of the present invention is disposed to overlap with the rear side of the non-spherical inner lens for the low-beam light source. Thus, due to the disposing of the control board on the rear side of the non-spherical inner lens of the low-beam light source, which is constantly lit during traveling, the control board becomes difficult to see although existing on the rear side of the non-spherical inner lens and the appearance can be improved. Furthermore, size reduction of the headlight can be intended compared with disposing the control board in such a manner that the control board does not overlap with the rear side of the non-spherical inner lens.

In the above-described aspect of the invention, the low-beam light source is disposed on the upper side of the high-beam light source and the control board controls light emitted from both the low-beam light source and the high-beam light source. Therefore, the number of parts can be reduced and the cost can be reduced.

Furthermore, in the above-described aspect of the invention, the control board is disposed on the upper side relative to the low-beam light source. Thus, the control board does not overlap with the low-beam light source in the front-rear direction and therefore the headlight can be configured with a small size compactly in the front-rear direction.

Moreover, in the above-described aspect of the invention, the low-beam light source and the high-beam light source are attached to the housing made of a metal. Therefore, heat dissipation of the low-beam light source and the high-beam light source can be enhanced by the housing with good thermal conductivity and there is no need to separately provide a heat sink for the low-beam light source and the high-beam light source. Thus, the headlight can be allowed to have small size and thickness.

In addition, in the above-described aspect of the invention, the wiring connected to the low-beam light source and the high-beam light source are covered from the front side by the extension member that covers the circuit of the low-beam light source and the high-beam light source. Therefore, the wiring of the low-beam light source and the high-beam light source can be hidden by the extension member in front view and the appearance can be improved.

Furthermore, in the above-described aspect of the invention, the non-spherical inner lenses for the low-beam light source and the high-beam light source and the extension member are co-fastened to the housing by the plurality of screws disposed outside the low-beam light source and the high-beam light source in the vehicle width direction, and the wiring passes between the plurality of screws disposed on one side in the vehicle width direction and are connected to the control board. Therefore, reduction in the number of parts and the size of the headlight can be intended due to the co-fastening of the non-spherical inner lenses and the extension member and the connecting of the wiring of the low-beam light source and the high-beam light source to the board from the one side in the vehicle width direction.

Moreover, in the above-described aspect of the invention, the low-beam light source and the pair of left and right blinkers provided at the vehicle body front part lie in a line in the vehicle width direction in front view. Therefore, when the low-beam light source and either the left or right blinker emit light in conjunction with each other, they emit light at the same height level. This can improve the visibility.

In addition, in the above-described aspect of the invention, the non-spherical inner lens for the low-beam light source or the non-spherical inner lens for the high-beam light source is attached to the housing by the plurality of other screws disposed outside the low-beam light source or the high-beam light source in the vehicle width direction, and the plurality of screws and the plurality of other screws are different in the interval in the vehicle width direction. Thus, misassembly of the non-spherical inner lens for the low-beam light source and the non-spherical inner lens for the high-beam light source can be easily prevented.

MODE FOR CARRYING OUT THE INVENTION

One embodiment of the present invention will be described with reference to the drawings. In the description, expressions of directions, such as front, rear, left, right, upper, and lower, represent the directions with respect to the vehicle body unless particularly noted. Furthermore, symbol FR indicated in the respective diagrams represents the vehicle body front side. In addition, symbol UP represents the vehicle body upper side and symbol LH represents the vehicle body left side.

Figure 1:
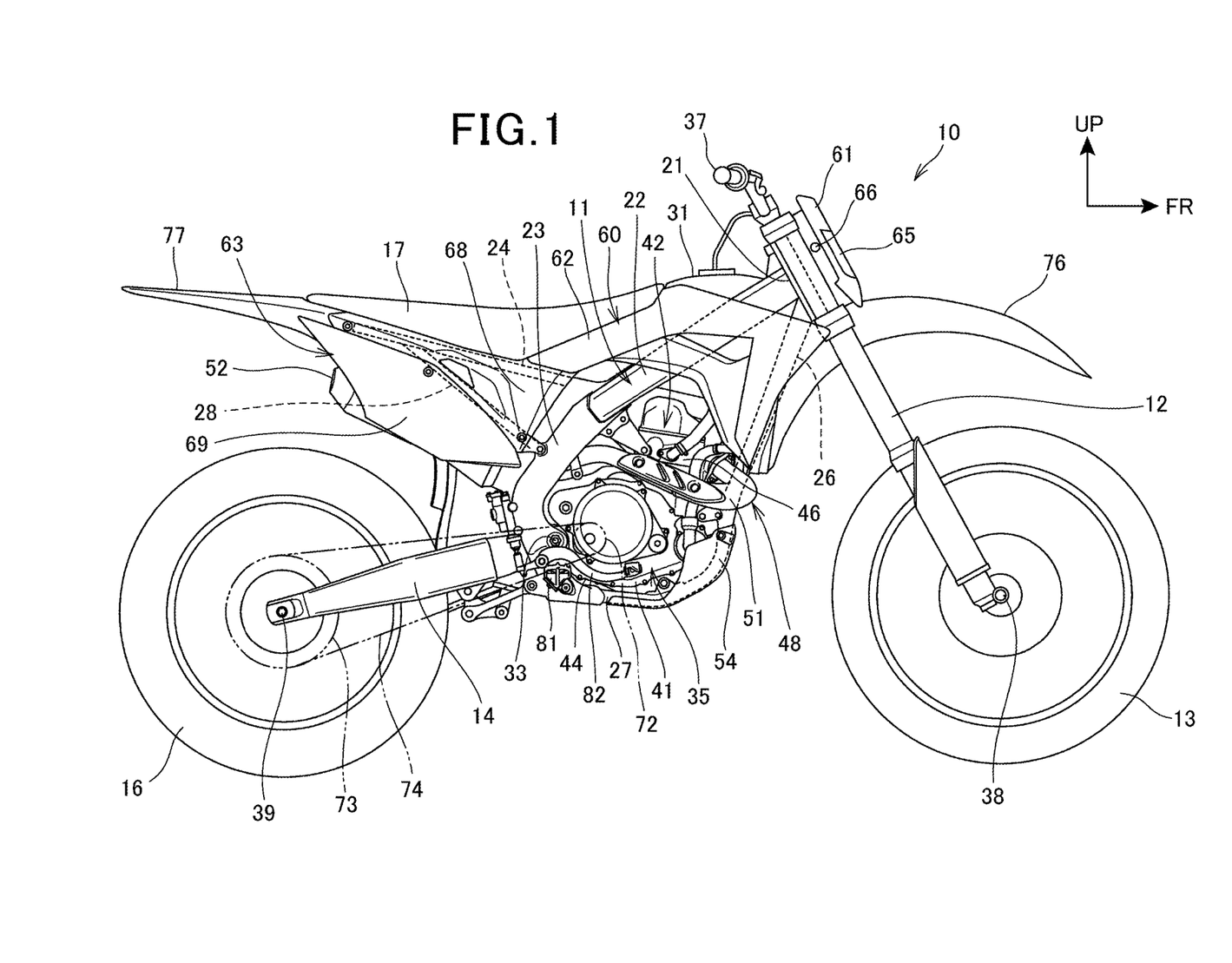
FIG. 1 is a right side view depicting a motorcycle according to the present invention.

FIG. 1 is a right side view depicting a motorcycle 10 according to the present invention.

The motorcycle 10 includes a front wheel 13 supported by the front end part of a vehicle body frame 11 with the intermediary of a front fork 12, a rear wheel 16 supported by the rear lower part of the vehicle body frame 11 with the intermediary of a swing arm 14, and a seat 17 supported by the upper part of the vehicle body frame 11. As above, the motorcycle 10 is a saddled vehicle a driver rides while straddling the seat 17.

The vehicle body frame 11 includes a head pipe 21, a pair of left and right main frames 22, a pair of left and right center frames 23, a pair of left and right seat frames 24, a down-frame 26, a pair of left and right lower frames 27, and a pair of left and right sub-frames 28.

The head pipe 21 forms the front end part of the vehicle body frame 11 and steerably supports the front fork 12. The main frames 22 extend from the upper part of the head pipe 21 rearward and obliquely downward and support a fuel tank 31 disposed in front of the seat 17. The center frames 23 extend from the rear end parts of the main frames 22 rearward and obliquely downward and then substantially downward. A space between the left and right center frames 23 is spanned by a pivot shaft 33 that swingably supports the front end part of the swing arm 14.

The left and right seat frames 24 extend from the upper end parts of the left and right center frames 23, respectively, rearward and obliquely upward and support the seat 17. The down-frame 26 extends from the lower part of the head pipe 21 downward and obliquely rearward. The left and right lower frames 27 extend from the lower end part of the down-frame 26 toward the left and right lower sides, respectively, and further extend rearward to be connected to the lower end parts of the left and right center frames 23, respectively. The left and right sub-frames 28 are connected to the upper parts of the left and right center frames 23, respectively, and the rear parts of the left and right seat frames 24, respectively.

An engine 35 is supported by the left and right center frames 23, the down-frame 26, and the left and right lower frames 27.

The front fork 12 supports a bar handle 37 by its upper end part and supports the front wheel 13 by the lower end part with the intermediary of a front axle 38. The swing arm 14 supports the rear wheel 16 by the rear end part with the intermediary of a rear axle 39.

The engine 35 includes a crankcase 41 and a cylinder unit 42 that extends upward from the front upper part of the crankcase 41.

A transmission 44 is integrally provided at the rear part of the crankcase 41.

The cylinder unit 42 includes a cylinder head 46. An intake system (not depicted) is connected to the rear part of the cylinder head 46 and an exhaust system 48 is connected to the front part. The exhaust system 48 has an exhaust pipe 51 connected to the cylinder 46 and a muffler 52 connected to the rear end part of the exhaust pipe 51.

At the front lower part of the vehicle body, an engine guard 54 that covers the engine 35, the left and right lower frames 27, and so forth from the front side and the lower side is disposed.

The vehicle body frame 11 is covered by a vehicle body cover 60.

The vehicle body cover 60 is composed of a front cover 61, a pair of left and right shrouds 62, and a pair of left and right side covers 63.

The front cover 61 covers the upper part of the front fork 12 from the front side. A headlight 65 is disposed on the front cover 61. The front cover 61 and the headlight 65 are attached to the front fork 12 with the intermediary of a stay (not depicted). A pair of left and right front blinkers 66 are attached to the above-described stay. The shrouds 62 cover the main frames 22 and the down-frame 26 from the lateral sides. The side covers 63 cover the seat frames 24 and the sub-frames 28 from the lateral sides. The side covers 63 are each composed of an upper side cover 68 that forms the upper part and a lower side cover 69 that forms the lower part.

A drive sprocket 72 is attached to the output shaft of the transmission 44 and a driven sprocket 73 is attached to the rear wheel 16. A chain 74 is stretched between the drive sprocket 72 and the driven sprocket 73 and power is transmitted from the transmission 44 to the rear wheel 16.

The front wheel 13 is covered by a front fender 76 from the upper side. The rear wheel 16 is covered by a rear fender 77 from the upper side. Steps 81 for driver are provided at the lower end parts of the center frames 23. A brake pedal 82 is disposed near the step 81 for driver.

Figure 2:
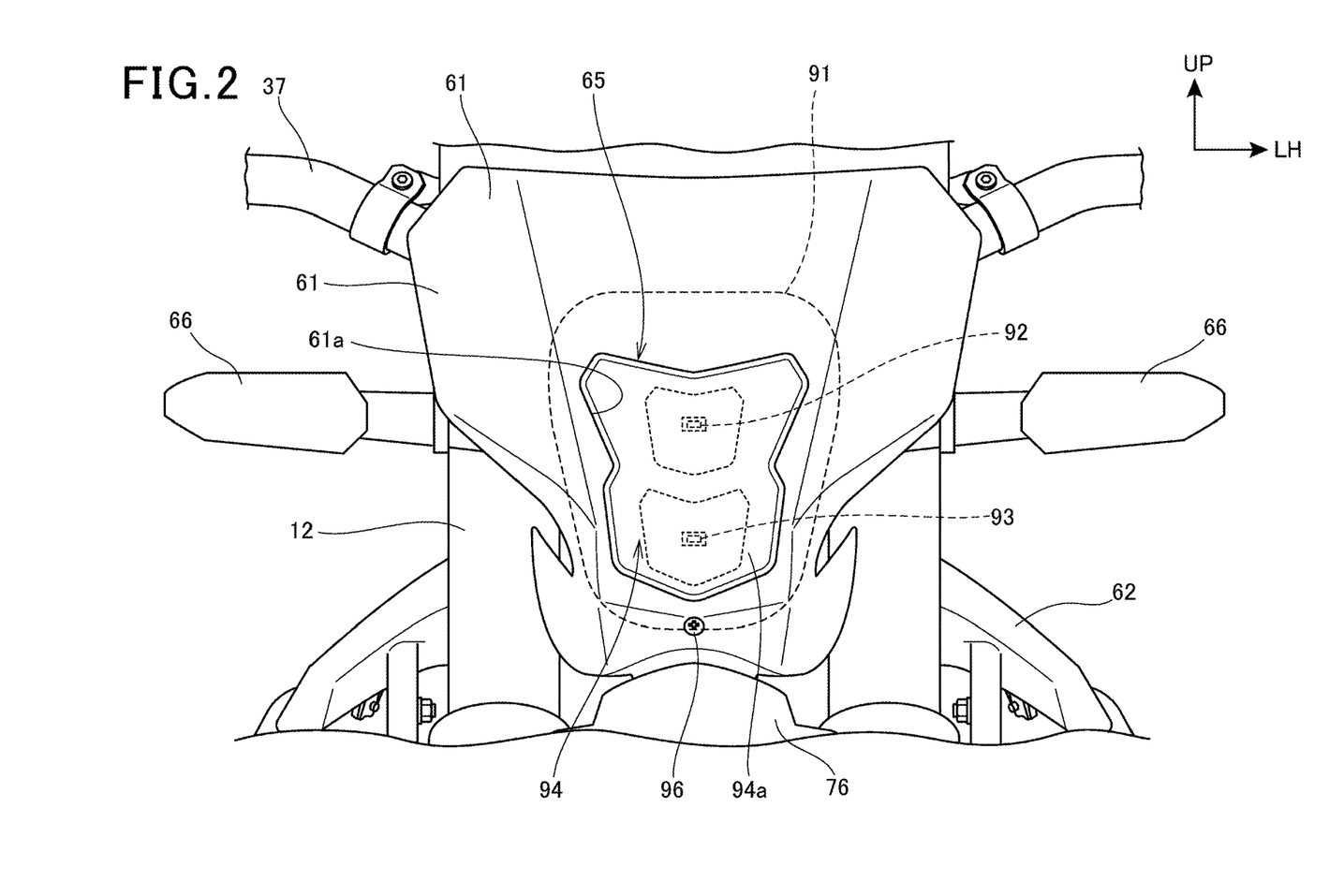
FIG. 2 is a front view depicting a headlight and the surroundings thereof.

FIG. 2 is a front view depicting the headlight 65 and the surroundings thereof.

The front cover 61 and the headlight 65 are attached to the front fork 12 with the intermediary of the stay (not depicted).

In the front cover 61, an opening part 61a is formed at the central part in the vehicle width direction.

The headlight 65 includes a housing 91, a low-beam light source 92 and a high-beam light source 93 attached to the housing 91, and a lens 94 that allows light emitted from the low-beam light source 92 and the high-beam light source 93 to be transmitted through the lens 94 toward the front side.

The low-beam light source 92 and the high-beam light source 93 are each formed of an LED and the low-beam light source 92 is disposed on the upper side of the high-beam light source 93. The lens 94 is attached to the circumferential edge part of the housing 91 and includes an exposed part 94a that is fitted to the opening part 61a of the front cover 61 and is exposed toward the front side.

The headlight 65 is made as a direct radiation type that causes light emitted from the low-beam light source 92 and the high-beam light source 93 to directly pass through the lens 94 and be radiated toward the vehicle front side. In a headlight provided with a reflector that reflects light, the reflector occupies a large space and has a complicated shape. In contrast, in the headlight 65 of the present embodiment, the reflector is unnecessary and thus size reduction and cost reduction can be intended.

On the front cover 61 below the exposed part 94a, a screw 96 that can change the orientation of the headlight 65 is exposed. By changing the orientation of the headlight 65 by the screw 96, the optical axis of the low-beam light source 92 and the high-beam light source 93 can be adjusted.

The low-beam light source 92 and the left and right front blinkers 66, 66 are disposed at the same height level.

As described above, the low-beam light source 92 and the front blinkers 66 as a pair of left and right blinkers provided at the vehicle body front part lie in a line in the vehicle width direction in front view. Due to this, when the low-beam light source 92 and either the left or right front blinker 66 emit light in conjunction with each other, they emit light at the same height level. This can improve the visibility.

Figure 3:
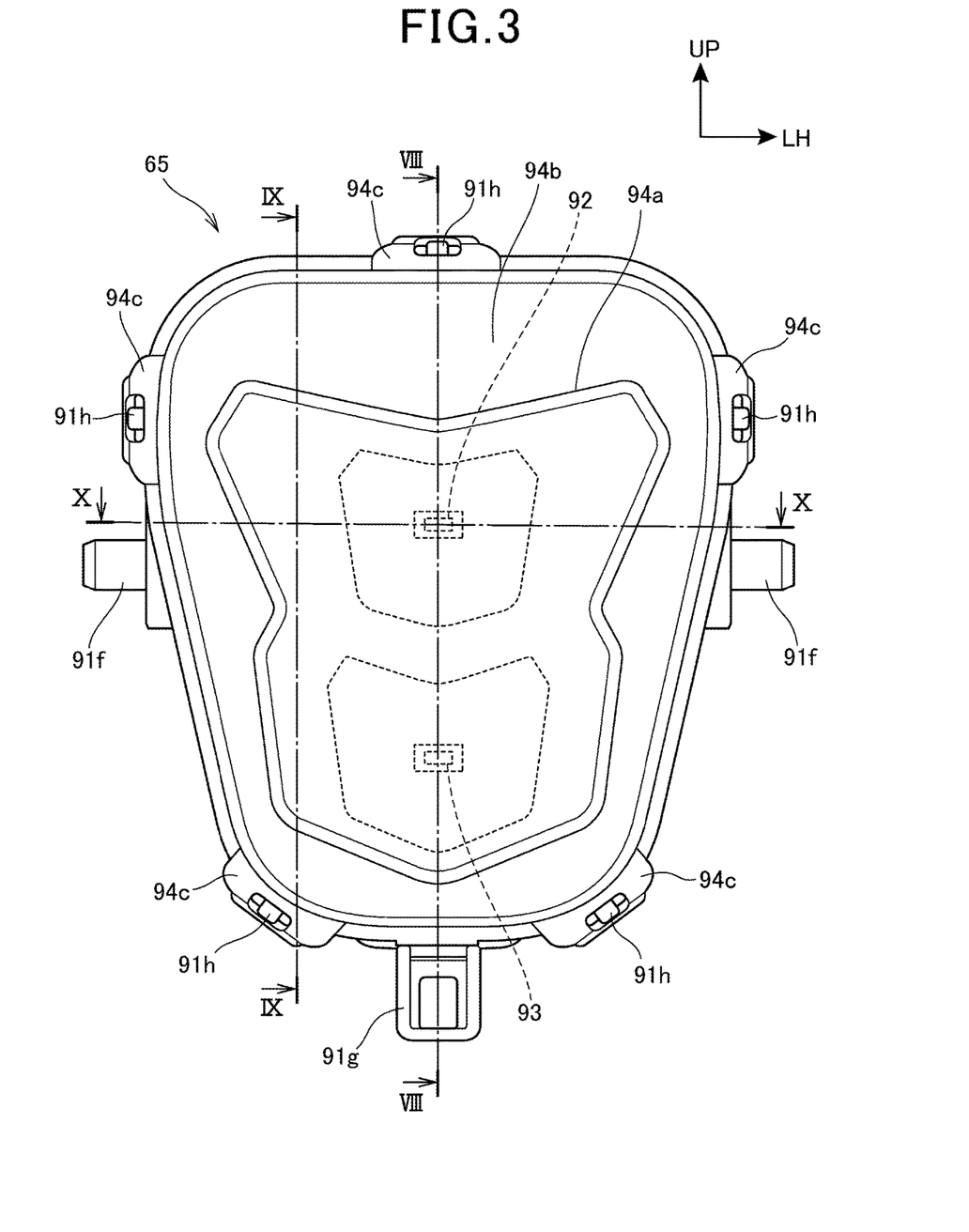
FIG. 3 is a front view depicting the headlight.
Figure 4:
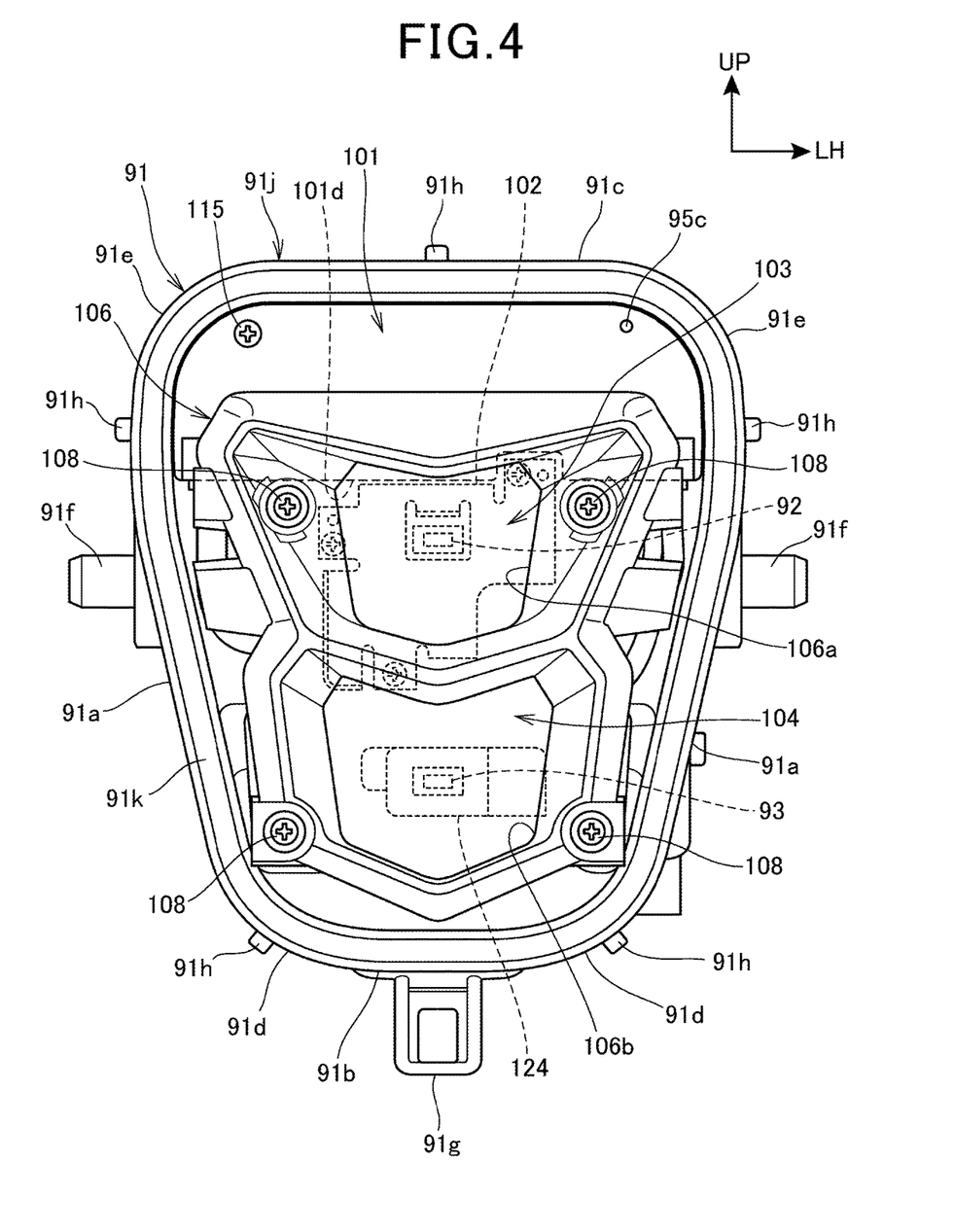
FIG. 4 is a front view depicting the state in which a lens has been removed from FIG. 3.

FIG. 3 is a front view depicting the headlight 65 and FIG. 4 is a front view depicting the state in which the lens 94 has been removed from FIG. 3.

As depicted in FIG. 3, the lens 94 of the headlight 65 includes a flat base part 94b attached to the circumferential edge part of the housing 91 and the exposed part 94a that is surrounded by the base part 94b and monolithically protrudes forward is provided.

As depicted in FIG. 4, to the housing 91, a board 101, a shade 102, an upper inner lens 103, a lower inner lens 104, and an extension member 106 are attached.

The contour of the housing 91 is formed into a substantially inverted trapezoidal shape whose width is larger in the vehicle width direction when the position is closer to the upper side, and the housing 91 includes left and right sidewalls 91a, 91a, a lower wall 91b, and an upper wall 91c that form the contour. Specifically, the housing 91 includes lower curved walls 91d, 91d that connect the left and right sidewalls 91a, 91a and the lower wall 91b and upper curved walls 91e, 91e that connect the left and right sidewalls 91a, 91a and the upper wall 91c. The lower curved walls 91d, 91d and the upper curved walls 91e, 91e also form the contour of the housing 91.

The above-described left and right sidewalls 91a, 91a, lower wall 91b, upper wall 91c, lower curved walls 91d, 91d, and upper curved walls 91e, 91e form an annular frame part 91j that protrudes forward. An annular groove 91k is formed in the front surface of the frame part 91j and the circumferential edge part of the lens 94 is fitted into the annular groove 91k.

Shaft parts 91f, 91f that protrude toward the lateral sides are formed on the left and right sidewalls 91a, 91a monolithically. An engagement part 91g that protrudes downward is formed on the lower wall 91b monolithically. The left and right shaft parts 91f, 91f are rotatably supported by the above-described stay (not depicted). The engagement part 91g is a part with which a nut (not depicted) that is screw-joined to the screw 96 (see FIG. 2) for optical axis adjustment of the headlight 65 (see FIG. 2) is engaged. By rotating the screw 96, the engagement part 91g swings forward and rearward around the left and right shaft parts 91f, 91f through the nut. That is, the optical axis of the headlight 65 moves upward and downward, which enables optical axis adjustment.

Furthermore, plural protruding parts 91h that protrude outward are formed on the left and right sidewalls 91a, 91a, the upper wall 91c, and the lower curved walls 91d, 91d monolithically.

Plural edge engagement parts 94c formed at the circumferential edge part of the lens 94 monolithically in FIG. 3 engage with the plural protruding parts 91h, and the lens 94 is fixed to the housing 91.

Because the fixing of the lens 94 to the housing 91 is carried out based on the engagement between the protruding parts 91h and the edge engagement parts 94c as above, the number of parts can be reduced compared with fixing by use of a special fastening member and man-hours for assembling can also be reduced. Therefore, the cost can be reduced.

In FIG. 4, the board 101 is disposed at a higher position than the low-beam light source 92 in the housing 91 and controls the respective light beams emitted from the low-beam light source 92 and the high-beam light source 93. The shade 102 has a structure that prevents sunlight from directly shining on the low-beam light source 92. The upper inner lens 103 is formed into a non-spherical shape and is disposed in front of the low-beam light source 92. The upper inner lens 103 allows light emitted from the low-beam light source 92 to be transmitted through the upper inner lens 103 toward the front side and be refracted in a predetermined direction. The lower inner lens 104 is formed into a non-spherical shape and is disposed in front of the high-beam light source 93. The lower inner lens 104 allows light emitted from the high-beam light source 93 to be transmitted through the lower inner lens 104 toward the front side and be refracted in a predetermined direction.

The extension member 106 includes an upper opening part 106a located in front of the low-beam light source 92 and a lower opening part 106b located in front of the high-beam light source 93. Furthermore, the extension member 106 covers the respective circumferential edge parts of the shade 102, the upper inner lens 103, and the lower inner lens 104 from the front side. The extension member 106 is attached to the housing 91 by plural screws 108.

Figure 5:
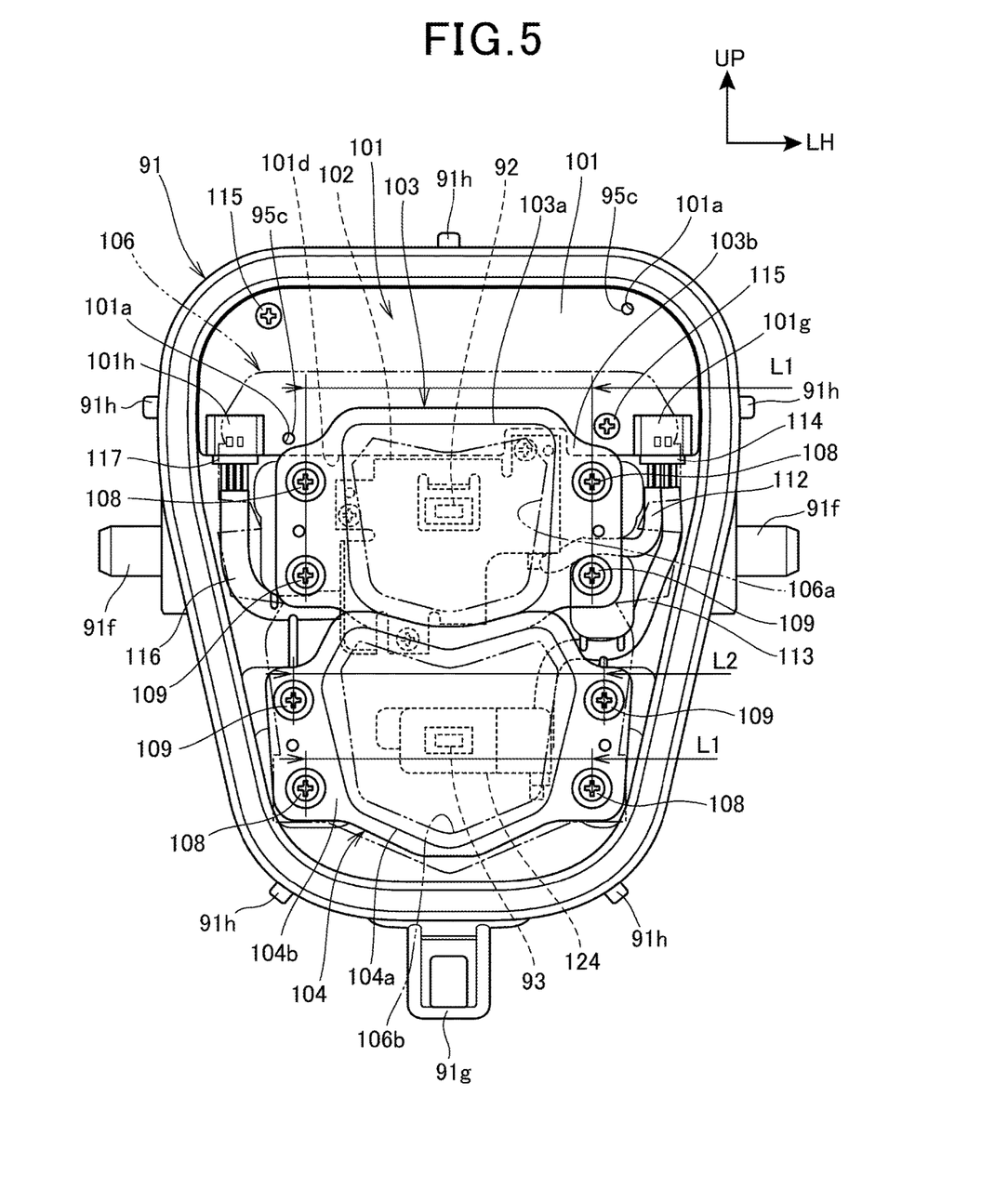
FIG. 5 is a front view depicting the state in which an extension member has been removed from FIG. 4.

FIG. 5 is a front view depicting the state in which the extension member 106 has been removed from FIG. 4.

One end part of each of wire harnesses 112 and 113 is connected to a respective one of the low-beam light source 92 and the high-beam light source 93. A common connector 114 is attached to the other end parts of the wire harnesses 112 and 113 and the connector 114 is connected to a connector 101g provided on the board 101.

The wire harnesses 112 and 113 are independent in the connector 114 and are connected to independent circuits on the board 101 via the connector 101g.

A pair of through-holes 101a, 101a for positioning are opened in the board 101, and a pair of projecting parts 95c, 95c for positioning that protrude forward from the housing 91 are inserted in these through-holes 101a, 101a for positioning, so that the board 101 is positioned. Furthermore, the board 101 is attached to the housing 91 by plural screws 115. A connector 117 of a wire harness 116 that supplies power from the external is connected to a connector 101h provided on the board 101.

As depicted in FIG. 4 and FIG. 5, the upper inner lens 103 includes an exposed part 103a exposed from an upper opening part 106a of the extension member 106 and a peripheral part 103b that surrounds the exposed part 103a. The lower inner lens 104 is disposed on the lower side relative to the upper inner lens 103 except that its upper edge part overlaps with the lower end part of the upper inner lens 103 in the front-rear direction. The lower inner lens 104 includes an exposed part 104a exposed from a lower opening part 106b of the extension member 106 and a peripheral part 104b that surrounds the exposed part 104a.

The peripheral parts 103b and 104b of the upper inner lens 103 and the lower inner lens 104 are attached to the housing 91 by plural screws 108 and 109. The plural screws 108 co-fasten the upper inner lens 103 and the extension member 106 and co-fasten the lower inner lens 104 and the extension member 106.

A lower side 101d of the board 101 overlaps with the exposed part 103a of the upper inner lens 103. That is, the lower end part of the board 101 can be visually recognized from the vehicle front side through the upper inner lens 103. However, when the main switch of the vehicle is turned on, the low-beam light source 92 is constantly lit and therefore it becomes difficult to visually recognize the board 101 from the vehicle front side.

In FIG. 5, the distance in the vehicle width direction between the pair of left and right screws 108, 108 that fix the upper inner lens 103 is equal to the distance in the vehicle width direction between the pair of left and right screws 109, 109 that fix the upper inner lens 103, and this distance is defined as L1. The distance here is the distance between the axial centers of the screws 108, 108 and the distance between the axial centers of the screws 109, 109.

The distance in the vehicle width direction between the pair of left and right screws 108, 108 that fix the lower inner lens 104 is L1. Furthermore, the distance in the vehicle width direction between the pair of left and right screws 109, 109 that fix the lower inner lens 104 is L2 longer than L1. L2 may be shorter than L1.

By making the interval between the left and right screws 109, 109 on the side of the lower inner lens 104 different from that on the side of the upper inner lens 103 as above, misassembly of the upper inner lens 103 and the lower inner lens 104 can be easily prevented.

For example, when assembling the lower inner lens 104 to the place to which the upper inner lens 103 is to be attached in the housing 91 is attempted, the difference in the left-right interval in screw insertion holes for the screws 109 can be immediately recognized by only seeing the lower inner lens 104, in which the screw insertion holes through which the screws 108 and 109 are made to pass are opened. Therefore, misassembly can be easily prevented.

As a method for preventing such misassembly, it is conceivable that the distance in the upward-downward direction between the screw 108 and the screw 109 is made different between the upper inner lens 103 and the lower inner lens 104, for example. However, in this method, when the distance is made slightly different, it is difficult to determine whether the relevant lens is the lens in which the distance in the upward-downward direction between the screw insertion holes is larger or the lens in which the distance is smaller when either the upper inner lens 103 or the lower inner lens 104 is seen, and it is not until the lens is placed over the housing 91 that misassembly can be recognized.

In contrast, by making the distance in the vehicle width direction between the left and right screws 109, 109 different as in the present embodiment, even if the difference in the distance is slight, the difference from the distance in the vehicle width direction between the screws 108, 108 can be easily recognized because comparison with the distance in the vehicle width direction between the screws 108, 108 located near can be made in the same lens.

As depicted in the above FIG. 4 and FIG. 5, the wire harnesses 112 and 113 as wiring connected to the low-beam light source 92 and the high-beam light source 93 are covered from the front side by the extension member 106 covering the surroundings (circuits) of the low-beam light source 92 and the high-beam light source 93. According to this configuration, the wire harnesses 112 and 113 of the low-beam light source 92 and the high-beam light source 93 can be hidden by the extension member 106 in front view and the appearance can be improved.

Furthermore, the upper inner lens 103 as the non-spherical inner lens for the low-beam light source 92 or the lower inner lens 104 as the non-spherical inner lens for the high-beam light source 93 is attached to the housing 91 by the plural other screws 109 disposed outside the low-beam light source 92 or the high-beam light source 93 in the vehicle width direction. The plural screws 108 and the plural other screws 109 are different in the interval in the vehicle width direction.

According to this configuration, misassembly of the upper inner lens 103 for the low-beam light source 92 and the lower inner lens 104 for the high-beam light source 93 can be easily prevented.

Figure 6:
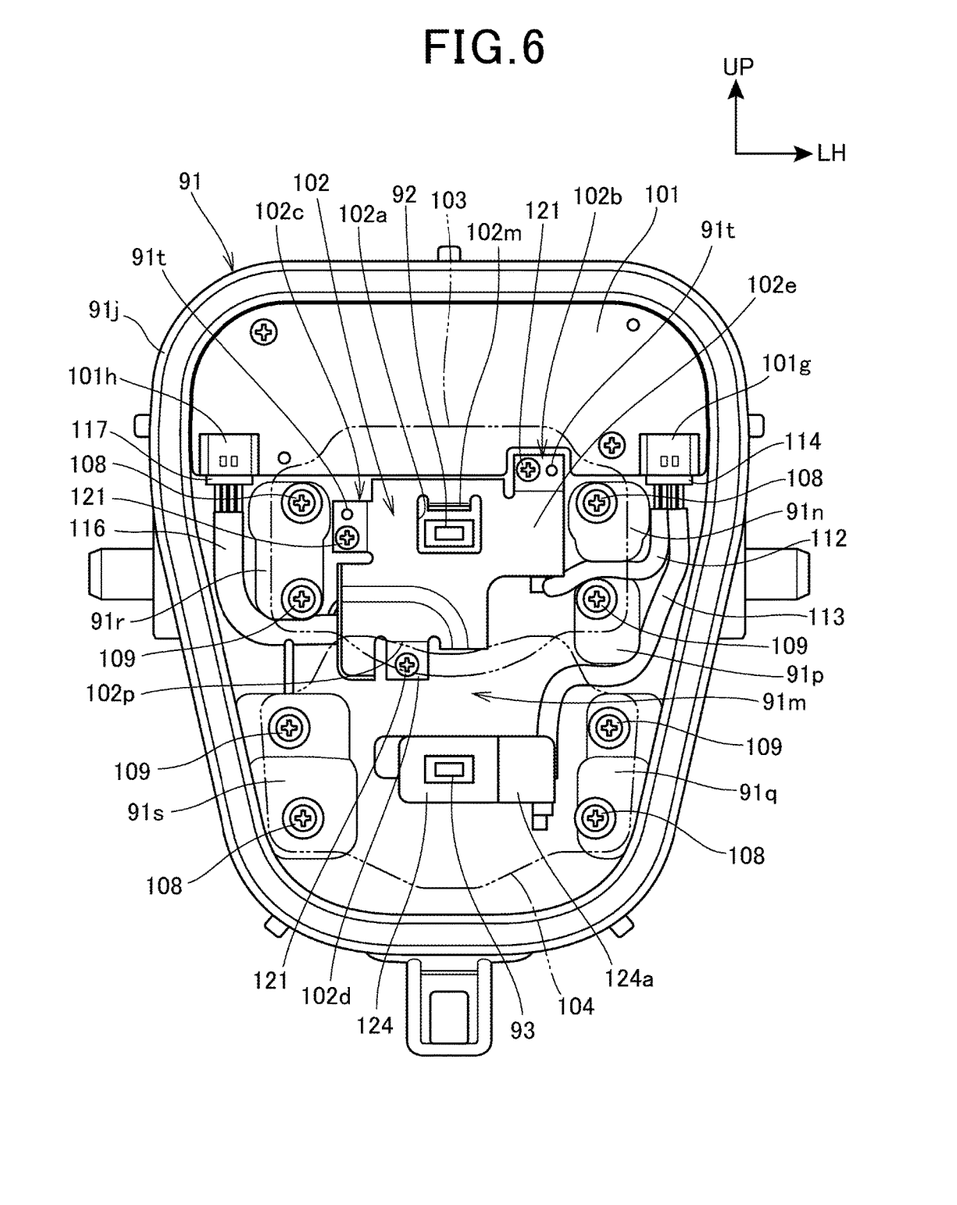
FIG. 6 is a front view depicting the state in which an upper inner lens and a lower inner lens have been removed from FIG. 5.

FIG. 6 is a front view depicting the state in which the upper inner lens 103 and the lower inner lens 104 have been removed from FIG. 5. In the state of FIG. 6, the screws 108 and 109 depicted in FIG. 5 are attached.

The shade 102 includes an opening part 102a located in front of the low-beam light source 92 and plural attaching parts 102b, 102c, and 102d for attaching to the housing 91. The plural attaching parts 102b, 102c, and 102d are each attached to the housing 91 by a screw 121. The pair of attaching parts 102b and 102c are positioned by projecting parts 91t for positioning provided on the housing 91. Furthermore, the shade 102 includes a flat part 102e in which the opening part 102a is formed and a canopy part 102m that extends forward from the upper edge of the opening part 102a. The canopy part 102m is a part that prevents sunlight from shining on the low-beam light source 92.

Furthermore, in front view, most part of the shade 102 overlaps with the upper inner lens 103 and the lower end part of the shade 102 overlaps with the lower inner lens 104.

The housing 91 includes a rear wall 91m provided at a recessed position on the rear side relative to the front edge of the frame part 91j and plural bump parts 91n, 91p, 91q, 91r, and 91s raised forward from the rear wall 91m. In the plural bump parts 91n, 91p, 91q, 91r, and 91s, screw holes (not depicted) into each of which the screw 108 or 109 is screwed are made.

The screws 108 are screwed into the respective screw holes of the bump parts 91n, 91q, 91r, and 91s and the screws 109 are screwed into the respective screw holes of the bump parts 91p, 91q, 91r, and 91s.

Figure 7:
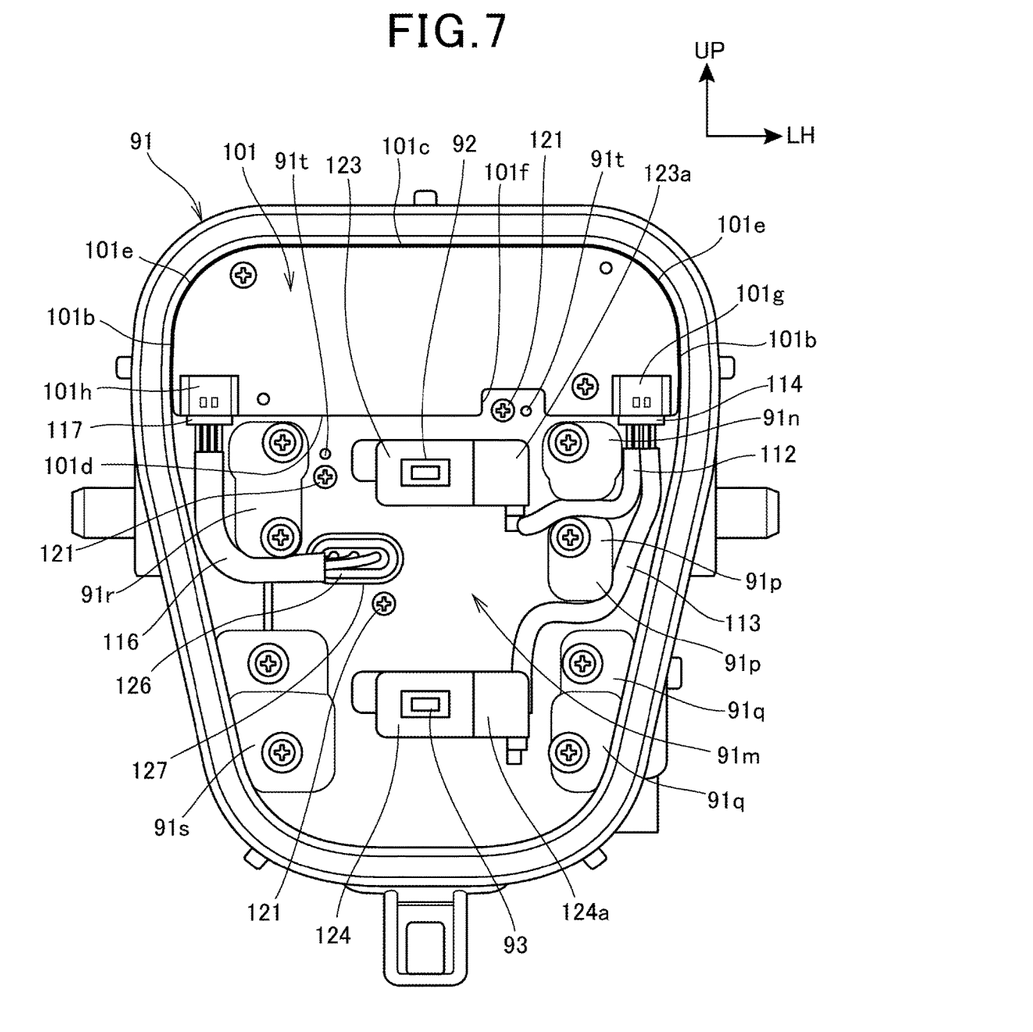
FIG. 7 is a front view depicting the state in which a shade has been removed from FIG. 6.

FIG. 7 is a front view depicting the state in which the shade 102 has been removed from FIG. 6.

In the state of FIG. 7, the plural screws 121 depicted in FIG. 6 are attached.

The low-beam light source 92 and the high-beam light source 93 are attached at the center in the vehicle width direction of the housing 91 with separation between the upper and lower sides. Specifically, the low-beam light source 92 and the high-beam light source 93 are attached to light source attaching members 123 and 124, respectively, and the light source attaching members 123 and 124 are attached to the housing 91. The light source attaching members 123 and 124 are provided with harness coupling connectors 123a and 124a connected to the low-beam light source 92 and the high-beam light source 93 via leads (not depicted) and the wire harnesses 112 and 113 are connected to the harness coupling connectors 123a and 124a, respectively.

The board 101 includes left and right lateral sides 101b, 101b, an upper side 101c, a lower side 101d, and left and right curved sides 101e, 101e.

The left and right lateral sides 101b, 101b and the upper side 101c are formed into a straight line shape. The lower side 101d is a part in which a notch 101f is formed at part of a straight line. The attaching part 102b (see FIG. 6) of the shade 102 (see FIG. 6) is disposed in the notch 101f. The left and right curved sides 101e, 101e are curved parts that connect the left and right lateral sides 101b, 101b and the upper side 101c.

The wire harness 112 is made to pass between two bump parts 91n and 91p and is held by the bump parts 91n and 91p. The wire harness 113 is disposed between two bump parts 91p and 91q and is made to abut against the lower part of the bump part 91p to be positioned. The wire harness 116 is made to abut against the lower part of the bump part 91r to be positioned.

In this manner, holding and positioning of the wire harnesses 112, 113, and 116 are enabled by the bump parts 91n, 91p, 91q, and 91r.

The wire harness 116 has a connector 126 at an end part and the connector 126 is connected to a connector 127 provided on the rear wall 91m of the housing 91. A wire harness (not depicted) is connected to the connector 127 from the outside of the headlight 65 (see FIG. 3) and supply or interruption of power is carried out.

As described above, the low-beam light source 92 is disposed on the upper side of the high-beam light source 93 and the board 101 as a control board controls light emitted from both the low-beam light source 92 and the high-beam light source 93. According to this configuration, the number of parts of the headlight 65 can be reduced and the cost can be reduced.

Furthermore, the board 101 is disposed on the upper side relative to the low-beam light source 92. Thus, the board 101 does not overlap with the low-beam light source 92 in the front-rear direction and therefore the headlight 65 can be configured with a small size compactly in the front-rear direction.

Figure 8:
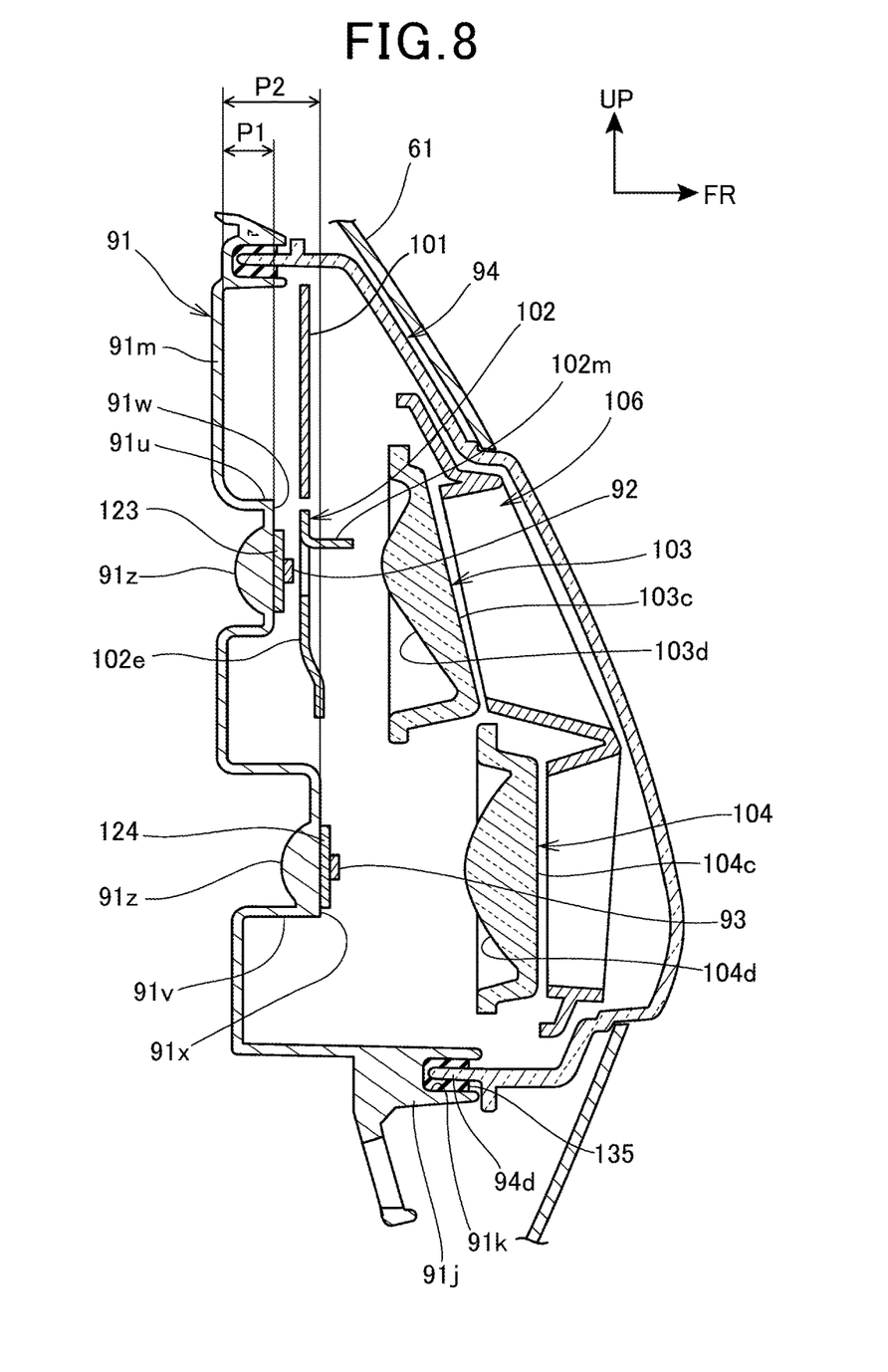
FIG. 8 is a sectional view along line VIII-VIII in FIG. 3.

FIG. 8 is a sectional view along line VIII-VIII in FIG. 3.

The housing 91 includes, at the central part in the vehicle width direction, an upper pedestal part 91u and a lower pedestal part 91v that protrude forward from the rear wall 91m. The light source attaching member 123 of the low-beam light source 92 is attached to a front end surface 91w of the upper pedestal part 91u and the light source attaching member 124 of the high-beam light source 93 is attached to a front end surface 91x of the lower pedestal part 91v. When the amounts of protrusion from the rear wall 91m to the front end surface 91w of the upper pedestal part 91u and the front end surface 91x of the lower pedestal part 91v are defined as P1 and P2, respectively, the amount P2 of protrusion is larger than the amount P1 of protrusion. That is, the high-beam light source 93 is located on the front side relative to the low-beam light source 92.

The shade 102 is disposed in front of the low-beam light source 92 and the board 101 is disposed on an extension line of the shade 102, specifically the upper side of the flat part 102e of the shade 102.

Furthermore, the upper inner lens 103 is disposed in front of the low-beam light source 92 and the shade 102. The lower inner lens 104 is disposed in front of the high-beam light source 93. By disposing the shade 102 (specifically, flat part 102e) and the board 101 in such a manner that they overlap in the upward-downward direction in this manner, the width of the headlight 65 in the front-rear direction can be made smaller and the headlight 65 can be allowed to have a small size.

The board 101 and the upper inner lens 103 overlap in front view of the headlight 65 (see also FIG. 5). Due to this, for example, compared with disposing the board 101 and the upper inner lens 103 in such a manner that they do not overlap in front view, the vertical dimensions of the headlight 65 can be made smaller and the headlight 65 can be allowed to have a smaller size.

The upper inner lens 103 and the lower inner lens 104 are convex lenses in which the respective front surfaces 103c and 104c are made as flat surfaces and the respective back surfaces 103d and 104d are made as non-spherical surfaces. The front surface 103c of the upper inner lens 103 is inclined in such a manner that the lower part is on the front side, and is oriented forward and obliquely upward. The front surface 104c of the lower inner lens 104 vertically extends and is oriented forward.

The extension member 106 covers, from the front side, the edge parts of the upper inner lens 103 and the lower inner lens 104 including the upper edge part and the lower edge part of the upper inner lens 103 and the lower inner lens 104, respectively.

The lens 94 is disposed in front of the extension member 106. In addition, an outer circumferential edge part 94d extends rearward and is inserted in the annular groove 91k of the frame part 91j of the housing 91. A seal member 135 is provided between the outer circumferential edge part 94d and the annular groove 91k and sealability between the housing 91 and the lens 94 is ensured.

As depicted in the above FIG. 5 and FIG. 8, the headlight 65 is mounted on the motorcycle 10 as a saddled vehicle. The headlight 65 includes the housing 91, the low-beam light source 92 and the high-beam light source 93, the board 101 as the control board, and the upper inner lens 103 and the lower inner lens 104 as the non-spherical inner lenses.

The low-beam light source 92 and the high-beam light source 93 are each formed of an LED that is housed in the housing 91 and radiates light. The board 101 controls light emitted from the low-beam light source 92 and the high-beam light source 93. The upper inner lens 103 and the lower inner lens 104 are provided in the housing 91 and allow each of light beams emitted from the low-beam light source 92 and the high-beam light source 93 to be transmitted through the upper inner lens 103 and the lower inner lens 104 toward the vehicle front side. At least part of the board 101 is disposed to overlap with the rear side of the upper inner lens 103 for the low-beam light source 92.

According to this configuration, the board 101 is disposed on the rear side of the upper inner lens 103 of the low-beam light source 92, which is constantly lit during traveling. Due to this, the board 101 becomes difficult to see although existing on the rear side of the upper inner lens 103 and the appearance can be improved. Furthermore, size reduction of the headlight 65 (specifically, size reduction of the headlight 65 in the upward-downward direction) can be intended compared with disposing the board 101 in such a manner that the board 101 does not overlap with the rear side of the upper inner lens 103.

Moreover, as depicted in FIG. 8, the low-beam light source 92 and the high-beam light source 93 are attached to the housing 91 made of a metal. According to this configuration, heat dissipation of the low-beam light source 92 and the high-beam light source 93 can be enhanced by the housing 91 with good thermal conductivity and there is no need to separately provide a heat sink for the low-beam light source 92 and the high-beam light source 93. Thus, the headlight 65 can be allowed to have small size and thickness.

Figure 9:
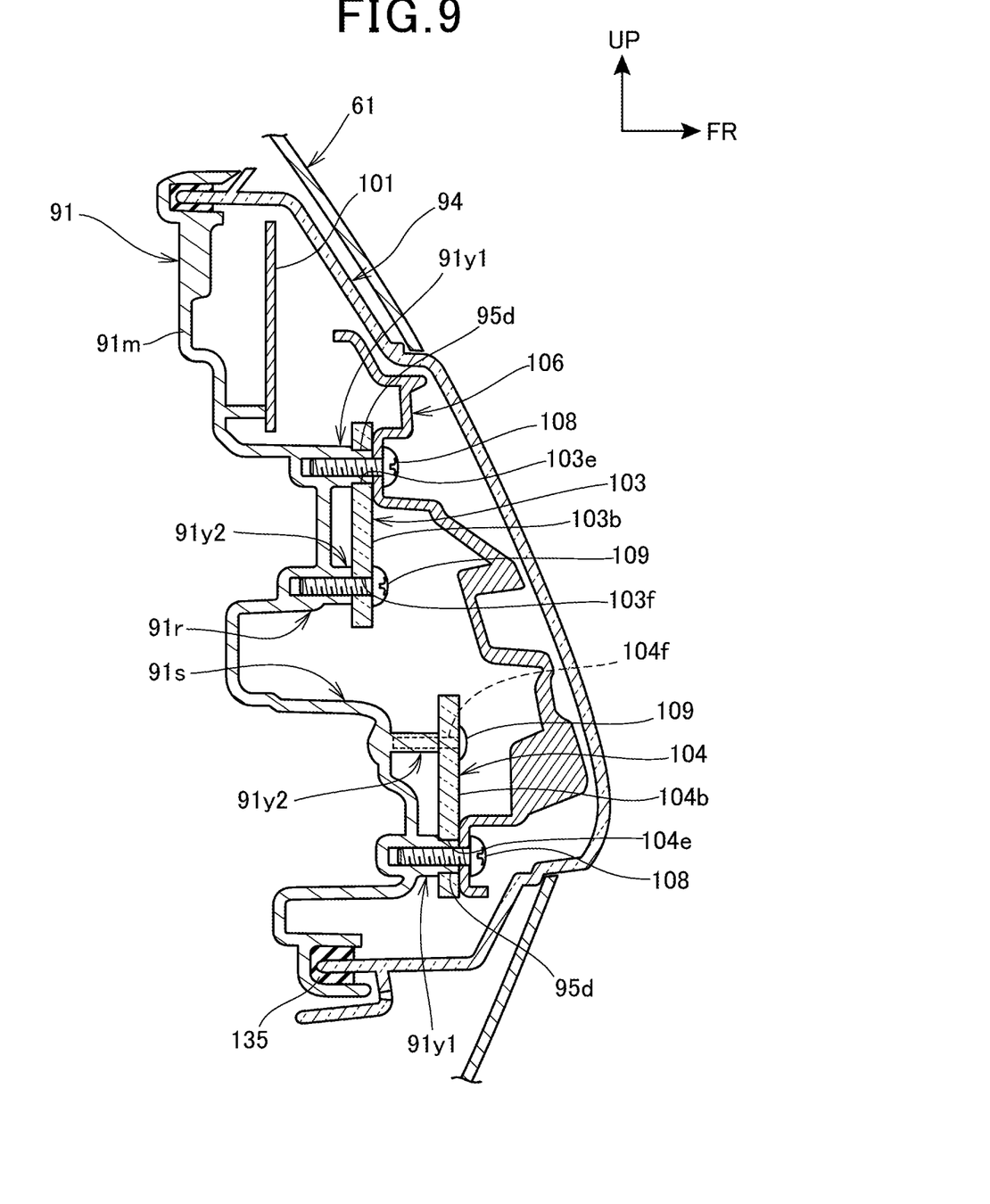
FIG. 9 is a sectional view along line IX-IX in FIG. 3.

FIG. 9 is a sectional view along line IX-IX in FIG. 3.

The bump parts 91r and 91s of the housing 91 include plural screw joining parts 91y1 and 91y2 into which the screws 108 and 109, respectively, are screwed.

In the screw joining parts 91y1, positioning small-diameter parts 95d for positioning the upper inner lens 103 and the lower inner lens 104 are formed at the tip parts. The positioning small-diameter part 95d is a part made to have a smaller diameter than the root part of the screw joining part 91y1.

Through-holes 103e and 104e for positioning are opened in the peripheral parts 103b and 104b of the upper inner lens 103 and the lower inner lens 104 and are fitted to the positioning small-diameter parts 95d, 95d of the housing 91.

The peripheral parts 103b and 104b of the upper inner lens 103 and the lower inner lens 104 and the extension member 106 are co-fastened by the screws 108 screwed into the screw joining parts 91y1.

Screw insertion holes 103f and 104f are opened in the peripheral parts 103b and 104b of the upper inner lens 103 and the lower inner lens 104. The peripheral parts 103b and 104b of the upper inner lens 103 and the lower inner lens 104 are made to abut against the end surfaces of the screw joining parts 91y2 and the screws 109 made to pass through the screw insertion holes 103f and 104f are screwed into the screw joining parts 91y2.

The bump part 91s protrudes to the vehicle front side relative to the bump part 91r. In association with this, the peripheral part 104b of the lower inner lens 104 protrudes to the vehicle front side relative to the peripheral part 103b of the upper inner lens 103. The peripheral part 103b of the upper inner lens 103 and the peripheral part 104b of the lower inner lens 104 are disposed in parallel to each other.

As depicted in the above FIG. 5, FIG. 6, and FIG. 9, the upper inner lens 103 and the lower inner lens 104 for the low-beam light source 92 and the high-beam light source 93 and the extension member 106 are co-fastened to the housing 91 by the plural screws 108 disposed outside the low-beam light source 92 and the high-beam light source 93 in the vehicle width direction. The wire harnesses 112 and 113 pass between the plural screws 108 disposed on one side in the vehicle width direction and are connected to the board 101.

According to this configuration, the upper inner lens 103, the lower inner lens 104, and the extension member 106 are co-fastened. Moreover, the wire harnesses 112 and 113 of the low-beam light source 92 and the high-beam light source 93 are connected to the board 101 from the one side in the vehicle width direction. This can intend reduction in the number of parts and the size of the headlight 65.

Figure 10:
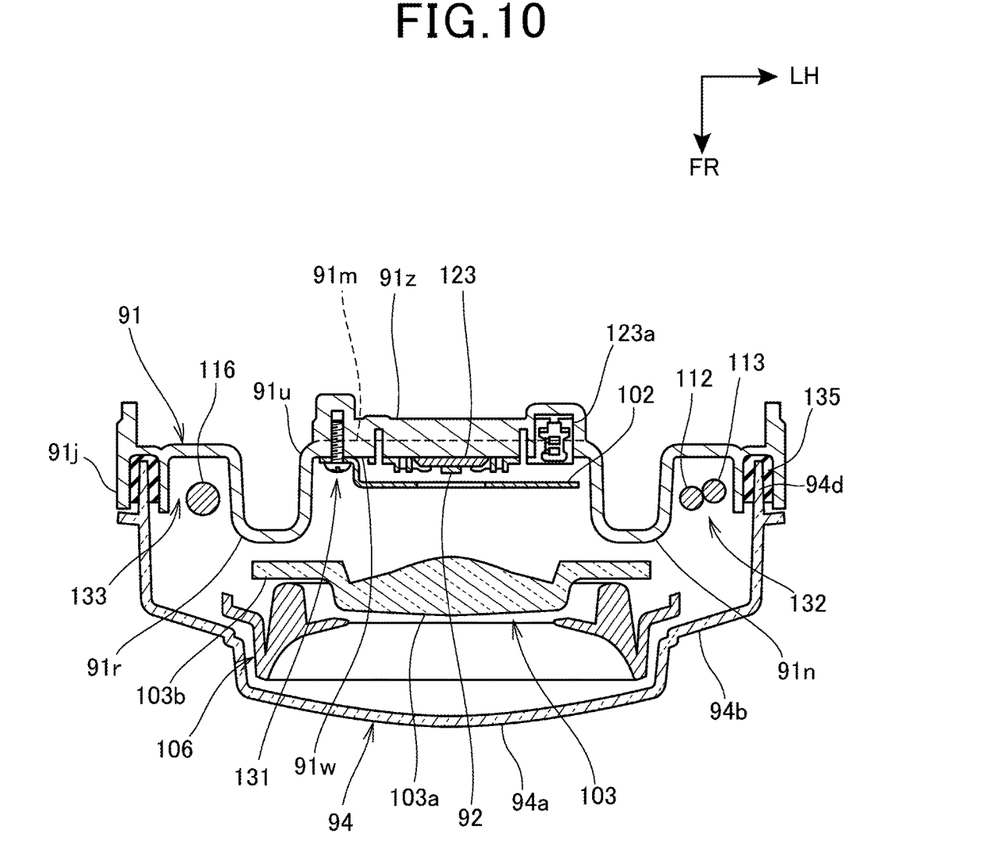
FIG. 10 is a sectional view along line X-X in FIG. 3.

FIG. 10 is a sectional view along line X-X in FIG. 3.

As depicted in FIG. 8 and FIG. 10, on the rear wall 91m of the housing 91, thick wall parts 91z, 91z are monolithically formed at the rear parts of the upper pedestal part 91u and the lower pedestal part 91v. The thick wall part 91z is formed at the respective rear parts of the upper pedestal part 91u and the lower pedestal part 91v in such a manner as to bulge rearward and extend in the vehicle width direction.

In FIG. 10, in the housing 91, a recess-shaped light source disposing space 131 in which the low-beam light source 92 is disposed is set between the left and right bump parts 91n and 91r. Furthermore, in the housing 91, a pair of left and right recess-shaped harness disposing spaces 132 and 133 in which the wire harnesses 112 and 113 and the wire harness 116, respectively, are disposed are set between the bump part 91n and the frame part 91j and between the bump part 91r and the frame part 91j.

As above, due to the setting of the harness disposing spaces 132 and 133, routing of the wire harnesses 112, 113, and 116 becomes easy. In addition, the wire harnesses 112, 113, and 116 are positioned and a large swing of them due to vehicle body vibrations or the like can be suppressed.

The above-described embodiment merely indicates one aspect of the present invention and modifications and applications can be arbitrarily made without departing from the gist of the present invention.

For example, in the above-described embodiment, separate bodies are employed as the upper inner lens 103 and the lower inner lens 104. However, the configuration is not limited thereto and the upper inner lens 103 and the lower inner lens 104 may be made monolithic.

Furthermore, although the canopy part 102*m* is provided on the shade 102, the configuration is not limited thereto. A canopy part that protrudes to the upper side of the low-beam light source 92 may be provided on the rear wall 91*m* or the upper pedestal part 91*u* of the housing 91 monolithically.

Moreover, although the low-beam light source 92 and the high-beam light source 93 are attached to the light source attaching members 123 and 124 separate from each other, the configuration is not limited thereto. The low-beam light source 92 and the high-beam light source 93 may be attached to one light source attaching member. In this case, wiring connected to the low-beam light source 92 and the high-beam light source 93 may be integrated into one wire harness and be connected to the board 101.

The present invention is not limited to the case of being applied to the motorcycle 10 and can be applied also to saddled vehicles including vehicles other than the motorcycle 10. The saddled vehicles include overall vehicles ridden with the vehicle body being straddled, and are vehicles including not only motorcycles (including also motorized bicycles) but also three-wheeled vehicles and four-wheeled vehicles categorized into all-terrain vehicles (ATV).

DESCRIPTION OF REFERENCE SYMBOLS

10 Motorcycle (saddled vehicle)
65 Headlight
66 Front blinker (blinker)
91 Housing
92 Low-beam light source
93 High-beam light source
101 Board (control board)
103 Upper inner lens (non-spherical inner lens)
104 Lower inner lens (non-spherical inner lens)
108 Screw
112, 113 Wire harness (wiring)

The invention claimed is:

1. A headlight structure of a saddled vehicle, comprising a headlight, wherein the headlight is mounted on the saddled vehicle in use, the headlight including a housing, a low-beam light source and a high-beam light source each formed of a light emitting diode that is housed in the housing and radiates light, a control board that has a circuit and that controls lighting from the low-beam light source and the high-beam light source, and a non-spherical inner lens, for the low-beam light source, that is provided in the housing and allows a light beam emitted from the low-beam light source to be transmitted through the non-spherical inner lens for the low-beam light source, a non-spherical inner lens, for the high-beam light source, that is provided in the housing and allows light beam emitted from the high-beam light source to be transmitted through the non-spherical inner lens for the high-beam light source, wherein
the control board is separately provided from the low-beam light source and the high-beam light source,
at least part of the control board is disposed at a rear side of the non-spherical inner lens for the low-beam light source, which is configured to be constantly lit during travelling of the saddled vehicle, and wherein the non-spherical inner lens for the low-beam light source and at least part of the control board overlap with each other in a front-rear direction.

2. The headlight structure of a saddled vehicle according to claim 1, wherein
the low-beam light source is disposed on an upper side of he high-beam light source.

3. The headlight structure of a saddled vehicle according to claim 2, wherein
the control board is disposed on an upper side relative to the low-beam light source.

4. The headlight structure of a saddled vehicle according to claim 2, wherein
the low-beam light source and the high-beam light source are attached to the housing made of a metal.

5. The headlight structure of a saddled vehicle according to claim 2, wherein
wiring connected to the low-beam light source and the high-beam light source are covered from a front side by an extension member that covers a circuit of the low-beam light source and the high-beam light source.

6. The headlight structure of a saddled vehicle according to claim 2, wherein
the low-beam light source and a pair of left and right blinkers provided at a vehicle body front part lie in a line in a vehicle width direction in front view.

7. The headlight structure of a saddled vehicle according to claim 1, wherein
the control board is disposed on an upper side relative to the low-beam light source.

8. The headlight structure f a saddled vehicle according to claim 7, wherein
the low-beam light source and the high-beam light source are attached to the housing made of a metal.

9. The headlight structure of a saddled vehicle according to claim 7, wherein
wiring connected to the low-beam light source and the high-beam light source are covered from a front side by an extension member that covers a circuit of the low-beam light source and the high-beam light source.

10. The headlight structure of a saddled vehicle according to claim 7, wherein
the low-beam light source and a pair of left and right blinkers provided at a vehicle body front part lie in a line in a vehicle width direction in front view.

11. The headlight structure of a saddled vehicle according t claim 1, wherein
the low-beam light source and the high-beam light source are attached to the housing made of a metal.

12. The headlight structure of a saddled vehicle according to claim 11, wherein
wiring connected to the low-beam light source and the high-beam light source are covered from a front side by an extension member that covers a circuit of the low-beam light source and the high-beam light source.

13. The headlight structure of a saddled vehicle according to claim 11, wherein the low-beam light source and a pair of left and right blinkers provided at a vehicle body front part lie in a line in a vehicle width direction in front view.

14. The headlight structure of a saddled vehicle according to claim 1, wherein
wiring connected to the low-beam light source and the light-beam light source are covered from a front side by an extension member hat covers a circuit of the low-beam light source and the high-beam light source.

15. The headlight structure of a saddled vehicle according to claim 14, wherein
the non-spherical inner lenses for the low-beam light source and the high-beam light source and the extension member are co-fastened to the housing by a plurality of screws disposed outside the low-beam light source and the high-beam light source in a vehicle width direction, and the wiring passes between the plurality of screws disposed on one side in the vehicle width direction and are connected to the control board.

16. The headlight structure of a saddled vehicle according to claim 15, wherein
the non-spherical inner lens for the low-beam light source or the non-spherical inner lens for the high-beam light source is attached to the housing by a plurality of other screws disposed outside the low-beam light source or the high-beam light source in the vehicle width direction, and the plurality of screws and the plurality of other screws are different in an interval in the vehicle width direction.

17. The headlight structure of a saddled vehicle according to claim 14, wherein
the low-beam light source and a pair of left and right blinkers provided at a vehicle body front part lie in a line in a vehicle width direction in front view.

18. The headlight structure of a saddled vehicle according to claim 15, wherein
the low-beam light source and a pair of left and right blinkers provided at a vehicle body front part lie in a line in a vehicle width direction in front view.

19. The headlight structure of a saddled vehicle according to claim 1, wherein
the low-beam light source and a pair of left and right blinkers provided at a vehicle body front part lie in a line in a vehicle width direction in front view.

20. The headlight structure of a saddled vehicle according to claim 1, wherein
the control board is disposed at an upper side of the low-beam light source and the high-beam light source.

* * * * *